US012772972B2

(12) United States Patent
Francis et al.

(10) Patent No.: US 12,772,972 B2
(45) Date of Patent: Oct. 27, 2026

(54) LIQUID ELECTRICAL VAPORIZER

(71) Applicant: EH Pest Limited, Slough (GB)

(72) Inventors: Edward Francis, Udyog Vihar (IN); Ankita Khanna, Udyog Vihar (IN); Deeksha Punj, Udyog Vihar (IN); Skand Saksena, Udyog Vihar (IN)

(73) Assignee: EH PEST LIMITED, Slough (GB)

(*) Notice: Subject to any disclaimer, the term of this patent is extended or adjusted under 35 U.S.C. 154(b) by 652 days.

(21) Appl. No.: 18/256,435

(22) PCT Filed: Dec. 14, 2021

(86) PCT No.: PCT/GB2021/053280
§ 371 (c)(1),
(2) Date: Jun. 8, 2023

(87) PCT Pub. No.: WO2022/129885
PCT Pub. Date: Jun. 23, 2022

(65) Prior Publication Data

US 2024/0099290 A1 Mar. 28, 2024

(30) Foreign Application Priority Data

Dec. 15, 2020 (IN) ............................ 202041054452
Jan. 29, 2021 (GB) ..................................... 2101270

(51) Int. Cl.
*A01M 29/12* (2011.01)

(52) U.S. Cl.
CPC .................................. *A01M 29/12* (2013.01)

(58) Field of Classification Search
CPC ... A01M 29/12; A01M 1/2044; A01M 1/2033
(Continued)

(56) References Cited

U.S. PATENT DOCUMENTS 5,242,111 A * 9/1993 Nakoneczny ........... A61L 9/127
239/47
8,750,693 B2 6/2014 Sharma et al.
(Continued)

FOREIGN PATENT DOCUMENTS

EP 0897755 B2 2/1999
WO 2009073813 A1 6/2009

OTHER PUBLICATIONS

International Search Report and Written Opinion for PCT Application No. PCT/GB2021/053280 mailed Mar. 16, 2022.
(Continued)

*Primary Examiner* — Phuong T Nguyen
(74) *Attorney, Agent, or Firm* — DUNLAP CODDING, P.C.

(57) ABSTRACT

A wick for a liquid electric vaporiser comprises charcoal, inorganic minerals and water. Furthermore, the wick has a lower end and an upper end and is characterized in that the wick has a porosity between 24% and 44%. The wick exhibits a permeability between 3.2 and 9 mm per hour, wherein the permeability is a measure of a vertical travel speed of a solvent liquid to travel from the lower end to the upper end of the wick by capillary action when the lower end of the wick is placed in a pool of the solvent liquid having a viscosity of between 1 and 10 cP, in particular between 1 and 4 cP, and a pool depth of about 2-4 mm. The wick may be included in a liquid electric vaporiser.

20 Claims, 1 Drawing Sheet

(58) Field of Classification Search
USPC .......................................... 392/386, 395, 403
See application file for complete search history.

(56) References Cited

U.S. PATENT DOCUMENTS

| | | | | |
|---|---|---|---|---|
| 2010/0260491 | A1* | 10/2010 | Pitz | A61L 9/03 392/390 |
| 2012/0024975 | A1* | 2/2012 | Sharma | A01M 1/2044 239/6 |

OTHER PUBLICATIONS

Combined Search Report and Examination Report for United Kingdom Application No. GB2101270.3 mailed Dec. 15, 2022.

* cited by examiner

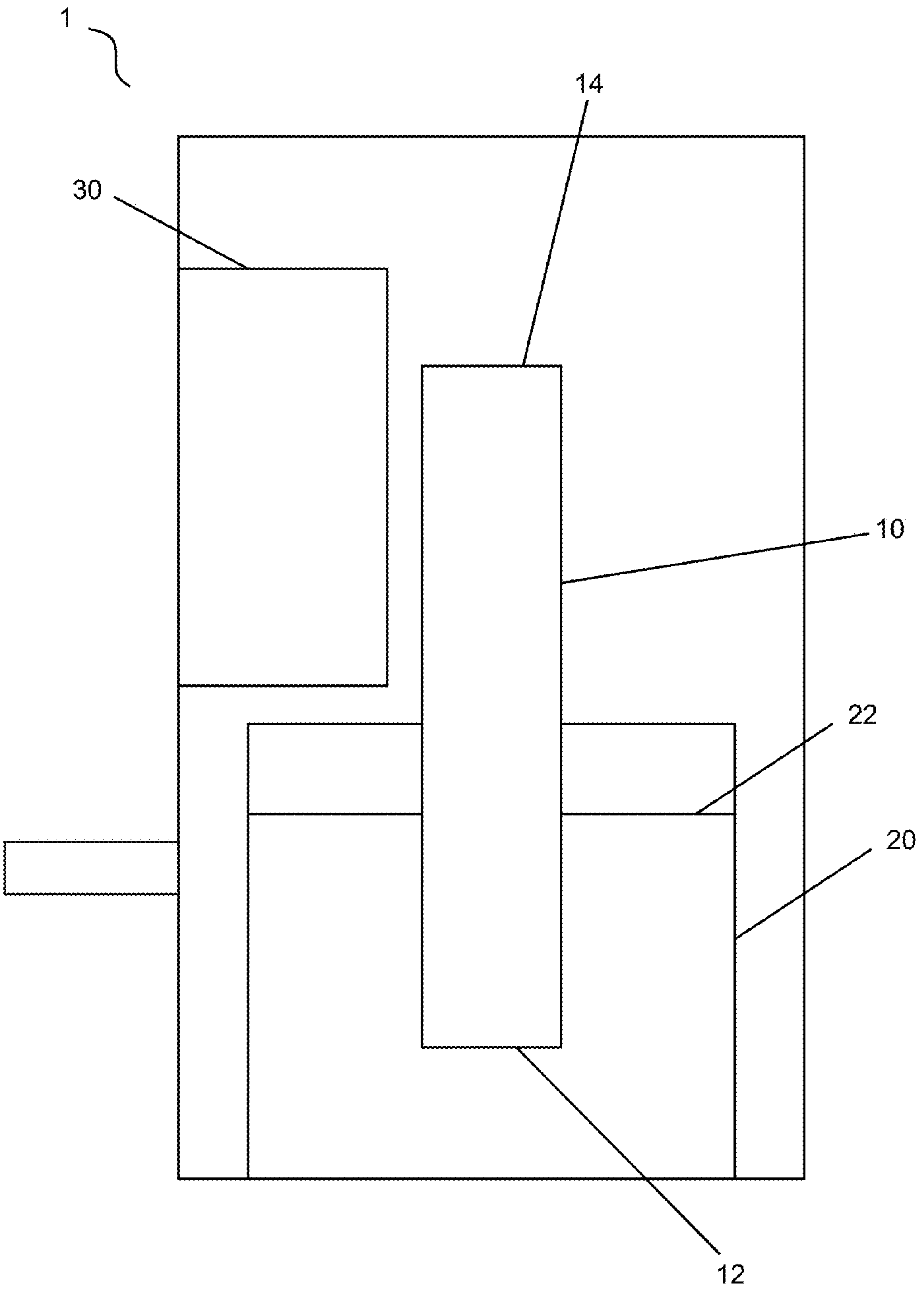
1
14
30
10
22
20
12

LIQUID ELECTRICAL VAPORIZER

CROSS-REFERENCE TO RELATED APPLICATIONS

This application is a U.S. National Phase of International Patent Application No. PCT/GB2021/053280, filed on 14 Dec. 2021, which claims priority to Indian Patent Application Serial No. 202041054452 filed on 15 Dec. 2020, and United Kingdom Patent Application No. 2101270.3 filed on 29 Jan. 2021. The entire contents of each of these applications are incorporated herein by reference in their entirety.

Background

Liquid electrical vaporisers are popular devices with consumers. They typically consist of a housing with plug to connect to mains electricity supply, a heater, a wick or other liquid transfer mechanism and a detachable refill bottle of a volatile liquid containing an active ingredient. Usually the wick forms part of the refill bottle and is designed such that on insertion into the housing, the wick is in close proximity to the heater.

The actives in the solutions typically used with liquid electrical vaporisers, are medicaments, insecticides such as insect repellents, and fragrances.

Typical commercial examples are Mortein® or Air Wick® plug in devices. These are used to provide insect repellence respectively fragrance release.

Once turned on and up to operating temperature, they can provide a steady, low or high intensity level as desired, emanation of a volatile active over days or even weeks.

Some of such devices suffer from oozing, such that the solution (liquid) comprising the active is dripping from the wick, when the device is turned off or even during operation. Furthermore, the achievable operating time until the liquid is exhausted can be low.

Brief Description of the Drawings

FIG. 1 is a graphic depiction of a liquid electrical vaporizer constructed in accordance with the present disclosure and comprising a wick.

Detailed Description

It is therefore an object of the present invention to suggest a wick for a liquid electric vaporiser which can overcome at least some of the disadvantages mentioned above. It is furthermore an object of the present invention to disclose an improved liquid electric vaporiser.

According to a first aspect of the invention, and with reference to FIG. 1, a wick 10 for a liquid electrical vaporizer 1 is disclosed, wherein the wick 10 comprises charcoal, further inorganic minerals and water. The further inorganic minerals can include silicates, phosphates, carbonates of calcium, magnesium, aluminium and mixtures thereof. The wick 10 has a lower end 12 and an upper end 14 and is characterized in that the wick 10 has a porosity between 24% and 44%, more preferably between 28% and 42%, and most preferably between 31% and 40% by volume. Porosity refers to a ratio of the total void volume of a porous object (here: the wick) to the total volume of the object. For a porous wick, porosity can e.g. be calculated by measuring the change in weight of a wick which is originally dry and subsequently saturated with a solvent by keeping the lower end of the wick in the solvent until the wick is fully wet. This change in weight is divided by the density of the solvent to calculate the volume of solvent picked up by the wick. The porosity can then be calculated as the volume of solvent picked up by the wick divided by the volume of the wick calculated using its physical dimensions.

Furthermore, the wick has a permeability between 3.2 and 9 mm per hour, more preferably between 3.8 and 8 mm per hour, and most preferably between 4 and 6 mm per hour, wherein the permeability is a measure of a vertical travel speed of a solvent liquid to travel from the lower end to the upper end of the wick by capillary action when the lower end of the wick is placed in a pool of the solvent liquid having a viscosity of between 1 and 10 cP, in particular between 1 and 4 cP, measured at 25 degrees Celcius using a Brookfield viscometer at 20 rpm, and a pool depth of about 2-4 mm.

Preferably, the wick has a length between the lower end and the upper end between 60 and 80 mm, or between 72 and 74 mm and most preferably between 72.5 and 73.5 mm.

In a second aspect of the invention, and with reference to FIG. 1, a liquid electrical vaporizer 1 is disclosed which comprises a wick 10 according to any of the wick embodiments as recited above. The liquid electric vaporiser 1 further includes a reservoir 20 holding a liquid 22 to be vaporised, wherein the liquid 22 comprises between 88% and 98% by weight of deodorised kerosene as a solvent. The wick 10 is submerged in the liquid 22, with its upper end 14 being above a liquid level and in contact with surrounding air. The liquid electric vaporiser 1 furthermore includes an electrical heating element 30 directed at the upper end 14 of the wick 10 and placed at a distance from the upper end 14, wherein the electrical heating element 30 is configured to vaporise all of the liquid 22 in the reservoir 20 within a target number of hours.

The reservoir preferably holds up to 45 ml of the liquid, most preferably 45 ml.

In order to obtain a reasonably long operating time without the need to refill the reservoir, it is advantageous if the target number of hours is between 480 hours and 620 hours, preferably greater than 480 hours and up to 600 hours.

In a preferred embodiment, the liquid further includes between 0.5% and 10% by weight of an active ingredient, the active ingredient comprising an insect repellent or a fragrance.

In another preferred embodiment, the electrical heating element is placed at a distance of about 6 mm from the upper end of the wick and is operated at a rated power of about 0.5 Watts in a first setting corresponding to a low intensity setting. The first setting can include a corresponding target wick temperature of 118+/−12 degrees Celsius.

The liquid electric vaporiser can further include a second setting corresponding to a high intensity setting with a maximum target wick temperature of 135+/−12 degrees Celsius.

In another preferred embodiment, the liquid comprises between 0.5% and 10% by weight of Transfluthrin as a mosquito repellent, wherein within 15-30 minutes of operation of the liquid electrical vaporiser, substantially all mosquitos from a mosquito population of *Aedes* mosquitos are repelled.

Preferably, 90% of a mosquito population of 100 *Aedes* mosquitos are knocked down within less than 25 minutes of operation of the liquid electric vaporiser.

The suggested wick according to the invention aims at controlling the emanation rate from a liquid vaporiser device by selectively choosing key parameters of the wick which control the transport of liquid to be vaporised through the wick. It is thus possible to increase the operating life of the vaporiser between refills without compromising bio-efficacy in case of using an insect repellent such as Transfluthrin as active ingredient. The characteristics of the wick can influence several performance parameters such as the lifetime (operating time between refills), strength of the wick (which can impact potential breakage during liquid transit), oozing of the liquid through the wick when the vaporiser is not plugged in leading to excess wetness and potential spillage, and the already mentioned bio-efficacy of the vaporiser, including knockdown effect on e.g. mosquitos.

In an experiment, a sample of wicks with properties as outlined above have been tested. The wicks were between 72 and 74 mm long. The lower end of the respective wick was placed in a shallow pool (about 2-3 mm level) of the solvent. The sample included a number of wicks having a porosity each between 36.98% and 39.52% by volume. It took the solvent between 13 and 14 hours to reach the upper end of the wick for each of the wicks in the sample. Reducing the porosity as compared to previously employed wicks leads to less or no issues with oozing. The consequently decreased emanation rate did not compromise the bio-efficacy in a mosquito repellent application, but the operating time could be increased. In the mosquito repellent application, when using a 45 ml liquid including the solvent and 0.5%-10% by weight of Transfluthrin, up to 76 nights (=8 hours per night) of operation were achieved without refill. This corresponds to about doubling the operating time compared to the previously employed wicks. Also the mosquito knockdown time was not compromised compared to the previous wicks when using wicks of the sample.

In a third aspect, the invention relates to the use of the liquid electric vaporiser according to the second aspect to kill, knockdown and/or repel insects.

In a preferred embodiment, said insects are flying insects, preferably mosquitoes.

Hence one or more objects of the present invention are achieved by the present which is further elucidated in the appended claims.

The invention claimed is:

1. A wick for a liquid electrical vaporizer, the wick comprising:

charcoal;

further inorganic minerals; and water, wherein the wick has a lower end and an upper end, and wherein the wick has a porosity between 24% and 44% by volume, and wherein the wick has a permeability between 3.2 and 9 mm per hour, the permeability being a measure of a vertical travel speed of a solvent liquid to travel from the lower end to the upper end of the wick by capillary action when the lower end of the wick is placed in a pool of a solvent liquid having a viscosity of between 1 and 10 cP, the viscosity measured at 25 degrees Celsius using a viscometer at 20 rpm, and a pool depth being about 2-4 mm.

2. The wick according to claim 1, wherein the further inorganic minerals include any of: silicates; phosphates; and carbonates of calcium, magnesium, aluminum, and mixtures thereof.

3. The wick according to claim 1, wherein a wick length between the lower end and the upper end is between 60 and 80 mm.

4. A liquid electrical vaporizer, comprising:

the wick according to claim 1;

a reservoir holding a liquid to be vaporized, the liquid comprising between 88% and 98% by weight of deodorized kerosene as a solvent, wherein the wick is submerged in the liquid, with the upper end being above a liquid level and in contact with surrounding air; and an electrical heating element directed at the upper end of the wick and placed at a distance from the upper end, the electrical heating element configured to vaporize all of the liquid in the reservoir within a target number of hours.

5. The liquid vaporizer according to claim 4, wherein the reservoir holds up to 45 ml of the liquid.

6. The liquid electric vaporizer according to claim 4, wherein the target number of hours is between 480 hours and 620 hours.

7. The liquid electric vaporizer according to claim 4, wherein the liquid further includes between 0.5% and 10% by weight of an active ingredient, the active ingredient comprising an insect repellent, or a fragrance.

8. The liquid electric vaporizer according to claim 7, wherein the insect repellent is a mosquito repellent.

9. The liquid electric vaporizer according to claim 8, wherein within 15-30 minutes of operation of the liquid electrical vaporizer, substantially all mosquitos from a mosquito population of *Aedes* mosquitos are repelled.

10. The liquid electric vaporizer according to claim 8, wherein 90% of a mosquito population of 100 *Aedes* mosquitos are knocked down within less than 25 minutes of operation of the liquid electric vaporizer.

11. The liquid electric vaporizer according to claim 4, wherein the electrical heating element is placed at a distance of about 6 mm from the upper end of the wick and is operated at a rated power of about 0.5 Watts in a first setting corresponding to a low intensity setting.

12. The liquid electric vaporizer according to claim 11, wherein the first setting includes a minimum target wick temperature of 118+/−12 degrees Celsius.

13. The liquid electric vaporizer according to claim 11, wherein the liquid electric vaporizer includes a second setting corresponding to a high intensity setting with a maximum target wick temperature of 135+/−12 degrees Celsius.

14. A method of using the liquid electric vaporizer according to claim 4 to kill, knockdown and/or repel insects, the method comprising operating the liquid electric vaporizer.

15. The method according to claim 14, wherein said insects are flying insects.

16. The wick of claim 1, wherein the wick has a porosity of between 28% and 42% by volume.

17. The wick of claim 1, wherein the wick has a porosity between 31% and 40% by volume.

18. The wick of claim 1, wherein the wick has a permeability between 3.8 and 8 mm per hour.

19. The wick of claim 1, wherein the wick has a permeability between 4 and 6 mm per hour.

20. The wick of claim 1, wherein the solvent liquid has a viscosity between 1 and 4 cP.

* * * * *